US012406569B1

(12) United States Patent
Finkle

(10) Patent No.: US 12,406,569 B1
(45) Date of Patent: Sep. 2, 2025

(54) PULL STATION HOUSING

(71) Applicant: Louis J Finkle, Lakewood (UA)

(72) Inventor: Louis J Finkle, Lakewood (UA)

( * ) Notice: Subject to any disclaimer, the term of this patent is extended or adjusted under 35 U.S.C. 154(b) by 0 days.

(21) Appl. No.: 19/185,076

(22) Filed: Apr. 21, 2025

(51) Int. Cl.
*G08B 25/12* (2006.01)
*G08B 17/06* (2006.01)

(52) U.S. Cl.
CPC ............. *G08B 25/12* (2013.01); *G08B 17/06* (2013.01)

(58) Field of Classification Search
CPC ................................ G08B 25/12; G08B 17/06
See application file for complete search history.

(56) References Cited

U.S. PATENT DOCUMENTS 6,506,987 B1 * 1/2003 Woods ............... H01H 36/0073 200/61.7
2007/0063821 A1 * 3/2007 Finkle .................... G08B 25/12 340/287
2020/0066125 A1 * 2/2020 Boguslawski ......... G08B 17/10

* cited by examiner

*Primary Examiner* — Davetta W Goins
*Assistant Examiner* — Sharmin Akhter
(74) *Attorney, Agent, or Firm* — AGK Patent & Trademark Law; Philip Y Kim

(57) ABSTRACT

The present invention comprises a pull station housing. A baseplate of the pull station housing may be attached to a surface. A frame may be removably attached to the baseplate and may form a perimeter around an alarm pull station. A housing magnet may be attached to the frame. A cover may be hingedly attached to the frame and may be separated from the baseplate by at least the frame. The cover may cover at least one side of the alarm pull station. A cover magnet of opposite polarity than the housing magnet may be connected to the cover and may be removably attached to the housing magnet by magnetic attraction. The alarm pull station may be accessed by rotating the cover away from the frame, thereby breaking the magnetic connection between the cover magnet and the housing magnet.

20 Claims, 11 Drawing Sheets

PULL STATION HOUSING

BACKGROUND OF THE INVENTION

The present invention relates to housings for alarm pull stations. Alarm pull stations are devices typically mounted to a wall that, when activated, cause an alarm to emit a noise. Alarm pull stations are typically electrically connected to an alarm system with multiple alarms spaced about a structure such as a school, office building, etc. Alarm pull stations are commonly used as fire alarms. If a user suspects a fire in a building, the user may activate the alarm pull station to cause one or more of the alarms to emit a noise, thereby warning others in the building of the fire.

Alarm pull stations are typically activated by pulling a lever. Pulling the lever causes an electrical connection to be sent to one or more alarms of the alarm system to which the alarm pull station is connected. Due to the electrical components required for the alarm pull station to function, alarm pull stations are often secured by a protective housing. The protective housing further serves to prevent the alarm pull station from being accidentally activated.

Most housings for alarm pull stations have a cover that is either broken by a user or moved out of the way to access the alarm pull station. In housings wherein the cover is broken to access the alarm pull station, there is a risk of broken glass or plastic that may harm the user that activates the alarm pull station. In housings wherein the cover is moved out of the way to access the alarm pull station, the cover is often secured in place with a snap feature that is difficult to engage to close the cover and is easily broken while opening the cover.

Many housings for alarm pull stations emit a noise and/or light when their cover is lifted to warn a user that the cover has been removed from the alarm pull station. The noise emitted by the alarm pull station housing is often quieter than the noise emitted by the alarms connected to the alarm pull station. In housings that emit light when their cover is lifted, multiple lights are often positioned around the housing however there are none that lights from the sides of the housing.

Traditional pull station covers often rely on snap-on mechanisms that can fail to secure properly, leading to accidental activations and increased maintenance costs. Additionally, existing designs frequently use screws to attach components, which creates potential entry points for moisture, reducing the effectiveness of the seal and increasing the risk of environmental damage. The current lack of side lighting in fire alarm covers can also hinder visibility at certain angles of view. Furthermore, servicing these covers is often cumbersome, requiring manual removal of security pins or screws.

SUMMARY OF THE INVENTION

The present invention addresses the above and other needs by providing a fire alarm pull station housing comprising a baseplate, a frame, a cover, a cover handle, a magnetic engagement means, and an alarm assembly. There are two types of mounting configuration for the pull station housing. The first is a flush mount configuration and the second is a surface mount configuration. In the flush mount configuration, the baseplate is also the frame. The baseplate is removably attached to a wall and forms a perimeter around the fire alarm pull station; the cover is hingedly attached to the baseplate; the magnetic engagement means engages the cover and the baseplate such that the cover is securely in the closed position. When a pull force is exerted upon the handle, sufficient to overcome the resistance of the magnetic engagement means, the cover is displaced laterally away from the frame in an open position triggering the alarm assembly. The magnetic engagement means secures the cover in the closed position after the alarm assembly has been reset.

In the surface mount configuration, the baseplate is attached to the wall; the frame, which forms a perimeter around the fire alarm pull station, is attached to the baseplate; and the cover is hingedly attached to the frame by the magnetic engagement means.

In various embodiments, the fire alarm pull station housing includes a magnetic engagement means for securing the cover in a closed position relative to the frame and/or baseplate. The magnetic engagement means may be configured to resist displacement of the cover under normal conditions and to release the cover when a predetermined force is applied, such as a pulling force on a handle or direct manual contact with the cover.

The magnetic engagement means may include permanent magnets, electromagnets, magnetic latches, or magnetic couplings. The magnets may be positioned on the interior surface of the cover and aligned with complementary magnetic or magnetically-attractable elements (e.g., ferromagnetic plates or steel inserts) located on the frame, baseplate, or other pull station housing component.

In one embodiment, one or more magnets are embedded or affixed within the cover, and corresponding ferrous components are integrated into the frame, thereby forming a releasable magnetic bond. Alternatively, magnets may be placed on the frame, with the cover comprising a ferrous or magnetically reactive engagement plate.

In some embodiments, the magnetic engagement means includes multiple magnetic contact points to increase holding strength or ensure uniform sealing around the perimeter of the cover. The magnets may be arranged symmetrically or asymmetrically depending on the desired force profile and accessibility requirements.

In other embodiments, the magnetic engagement means includes a selectively activatable magnetic release mechanism, wherein an electromagnet can be energized to release or secure the cover under electronic control.

The magnetic engagement means may further incorporate adjustable or tunable features, allowing the strength of the magnetic holding force to be adapted to specific applications or user preferences. For example, a shim or spacer element may be used to modulate the effective gap between magnetic elements, thereby adjusting the release force threshold.

In all embodiments, the magnetic engagement means is configured such that when a user exerts a force on the cover, such as pulling a handle, the magnetic retention is overcome and the cover moves to an open position, triggering an associated alarm assembly. After the alarm is deactivated or reset, the magnetic engagement means allows the cover to be repositioned and secured in the closed state without the need for mechanical latches or fasteners.

The magnetic engagement means may be used alone or in combination with mechanical hinges, biasing elements (e.g., springs), or dampers to provide smooth opening/closing action and controlled resistance.

The magnetic engagement means having a magnetic strength to compress a sealing member that is interposed between the cover and the frame, and wherein the magnetic engagement means urges the cover toward the frame, compressing the sealing member, thereby forming a substantially airtight and dust-resistant seal.

In accordance with one embodiment of the invention, there is provided a pull station housing with a cover hingedly attached to a frame or to a baseplate. The cover may have 5 cover sides, each with a cover side length and a cover side width. Certain cover sides may have different cover side lengths and cover side widths than other cover sides; i.e. some of the cover sides may be larger than others. Each of the 5 cover sides may be flat. The 5 cover sides may be joined by cover edges. The cover edges may be rounded and may each have a radius of curvature. The radii of curvature of the cover edges may be less than the smallest cover side width.

In accordance with one embodiment of the invention, the cover may be hingedly attached to the frame. In accordance with another embodiment of the invention, the pull station housing may not have a frame, and the cover may be hingedly attached to the baseplate. In all embodiments, the cover may cover at least one side of an alarm pull station. In embodiments of the pull station housing without the frame, the cover may form the perimeter around the alarm pull station that the frame forms in embodiments of the pull station housing with the frame.

In accordance with another embodiment of the invention, the alarm assembly having a housing; a sound emitter and a light source integrated within the alarm assembly housing. The sound emitter is configured to emit a noise when the cover is in the open position. The light source is also configured to emit light along the right and left sides of the alarm assembly housing when the cover is in the open position.

In accordance with another embodiment of the invention, the cover has an exterior surface and an interior surface. The interior surface of the cover having a plurality of nubs. The nubs are configured such that the alarm assembly is tightly held to the interior cover surface by the nubs by interference fit.

In accordance with another embodiment of the invention, an alarm delay mechanism is configured on the alarm assembly and may be electrically coupled to the sound emitter and/or the light source. When the cover of the pull station housing is in the open position, the sound emitter of the alarm assembly emits a loud noise. Pressing the delay assembly causes the sound emitter to cease emitting noise for a preprogramed time period. This may be accomplished by stopping the power supply to the noise emitter or by activating a switch that causes a current to stop flowing to the sound emitter. Pressing the delay mechanism will also cause the light to cease emitting light for the same period as the noise emitter.

In accordance with another embodiment of the invention, a frame sealing ring may form a seal between the frame and the baseplate; a cover sealing ring may form a seal between the cover and the frame; the cover sealing ring may form a seal between the cover and the baseplate. The cover sealing ring and the frame sealing ring may be an elastic material such as but not limited to silicone, rubber, or the like.

In accordance with another embodiment of the invention, a conduit opening is configured in the frame, through the baseplate, and between the frame and the baseplate. A conduit insert surrounds the conduit opening such that the conduit insert is configured in an opening within the frame, within the baseplate, or between the frame and the baseplate. A conduit is inserted through the conduit opening. The conduit wires connect to the alarm pull station and/or other electrical components of the pull station housing. The conduit insert holds the conduit in place. In some embodiments, the conduit insert may form a seal around the conduit. In some embodiments, the conduit insert may form a seal between the baseplate and the frame.

In accordance with another embodiment of the invention, a subplate is configured within the frame. The subplate separates the alarm pull station from the baseplate. The subplate having a subplate cutout that reveals at least a portion of the alarm pull station to the baseplate. The subplate cutout allows for access to the alarm pull station if electrical wires or other components are connected to the alarm pull station. The subplate cutout further allow access to the alarm pull station if temperature components such as heaters or fans are configured within the frame between the subplate and baseplate. In accordance with some embodiments, the subplate cutout are the same shape as the subplate.

In accordance with another embodiment of the invention, a fan is configured between the subplate and the baseplate. The fan removes moisture from the pull station housing by blowing moist air out of the pull station housing and/or by blowing dry air into the pull station housing. The fan regulates the temperature within the pull station housing by blowing cold or hot air onto the alarm pull station.

In accordance with another embodiment of the invention, a heater is configured between the subplate and the baseplate. The heater removes moisture from the pull station housing by heating the air within the pull station housing, thereby causing any water inside of the pull station housing to evaporate and be pushed out of the pull station housing by the fan. The heater regulates the temperature within the pull station housing by providing a source of heat when the pull station housing is implemented in a cold area such as an exterior wall of a building.

Both the fan and the heater may be considered "temperature components" of the pull station housing. These temperature components aid in regulating the temperature and humidity within the pull station housing. This is beneficial in ensuring that the alarm pull station, the noise emitter, the light source, and any other electrical components contained within the pull station housing function as intended throughout their intended lifespan. The fan and the heater may work in tandem to regulate the humidity within the pull station housing by evaporating water and then blowing the evaporated water out of the pull station housing. The fan and the heater work in tandem to regulate the temperature within the pull station housing by heating some of the air within the pull station housing and then blowing the heated air throughout the pull station housing, thereby heating the entire pull station housing.

In accordance with another embodiment of the invention, a plurality of subplate offsetters separate the subplate and the baseplate. The plurality of subplate offsetters may be 2 or more subplate offsetters, 4 or more subplate offsetters, 6 or more subplate offsetters, or any number between or including the values provided. Threaded fasteners thread through the subplate, through the subplate offsetters, and into the baseplate or frame to secure the subplate to the rest of the pull station housing. The subplate offsetters separate the subplate from the baseplate by ½ inch or more, 1 inch or more, 2 inches or more, or any distance between or including the values provided. The subplate offsetters allow for the fan and/or heater to be configured between the baseplate and the subplate.

BRIEF DESCRIPTION OF DRAWINGS

The above and other aspects, features and advantages of the present invention will be more apparent from the following more particular description thereof, presented in conjunction with the following drawings wherein.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to descript a feature's appearance to the human eye or human perception, and not a precise measurement, or typically within 10 percent of a stated value.

Figure 1:
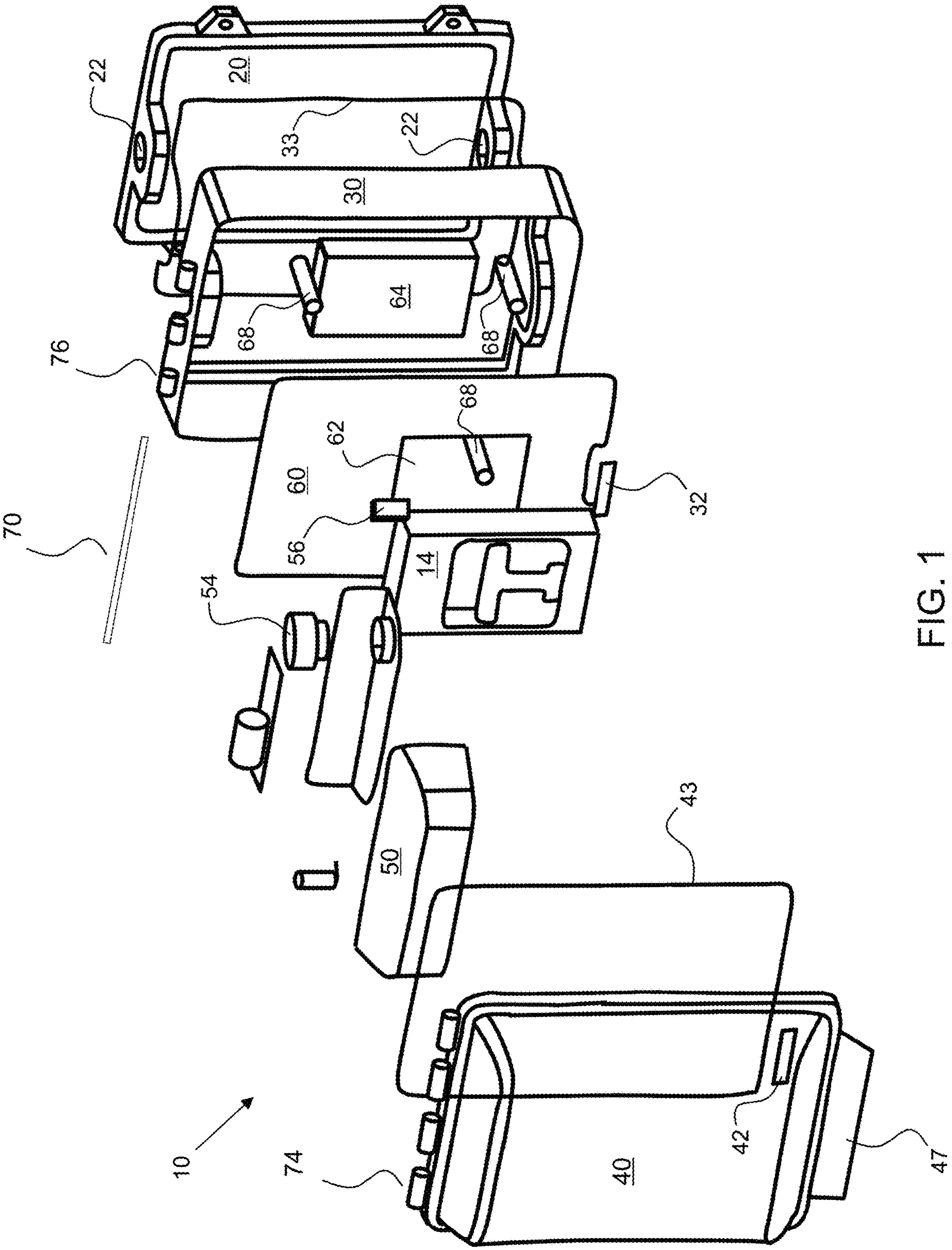
FIG. 1 is a perspective exploded view of a pull station housing in a surface mount configuration according to the present invention.

As shown in FIG. 1, the fire alarm pull station housing 10 comprising a frame 30 of a pull station housing 10 is attached to a baseplate 20 of the pull station housing 10. A frame sealing ring 33 is configured between the frame 30 and the baseplate 20 to form an airtight and watertight seal between the frame 30 and the baseplate 20. Conduit openings 22 are configured through the baseplate 20. The conduit openings 22 may allow a conduit that surrounds one or more wires to be passed through the baseplate 20 so that the wires may be coupled to various electrical components of the pull station housing 10. A temperature component 64 is configured within the frame 30. The temperature component 64 may be any device capable of regulating temperature and/or humidity levels within the pull station housing 10. The temperature component 64 may be a fan, a heater, or the like. The temperature component 64 may be electrically coupled to the wires of the conduit.

A subplate 60 is attached to the baseplate 20. Subplate offsetters 68 separate the baseplate 20 and the subplate 60 so that components such as the temperature component 64 is configured between the baseplate 20 and subplate 60. Threaded fasteners are threaded through the subplate 20, through the subplate offsetters 68, and into the baseplate 20 to attach the subplate 60 to the baseplate 20. In some embodiments, the threaded fasteners are threaded through the subplate 60, through the subplate offsetters 68, and into the frame 30 to attach the subplate 60 to the frame 30. In these embodiments the threaded fasteners may thread into a back portion of the frame that is adjacent to the baseplate 20.

An alarm pull station 14 is attached to one face of the subplate 60 such that the subplate 60 separates the alarm pull station 14 from the baseplate 20. The subplate 60 is situated within the frame 30 such that the alarm pull station 14 is completely situated within the frame 30. Alternatively, the subplate 60 may be situated within the frame 30 such that only a portion of the alarm pull station 14 is situated within the frame 30. The depth at which the subplate 60 is situated in the frame 30 is determined by the length of the subplate offsetters 68. The subplate 60 has a subplate cutout 62 that extends through the subplate 60. This allows at least a portion of the alarm pull station 14 to be exposed to the baseplate 20. This allows wires to be connected to the alarm pull station 14. This also allows the temperature component 64 to effectively regulate the temperature and/or humidity experienced by the alarm pull station 14.

The alarm pull station 14 may be any device that, when activated, causes an alarm to be activated. Most pull stations in the art are electrically connected to alarms. A lever on the alarm pull station 14 may be pulled to cause an electrical signal to be sent to the alarms, causing the alarms to emit a noise. The electrical and mechanical components of the alarm pull station 14 may be sensitive and may need to be protected. Therefore, the pull station housing 10 provides a physical barrier between the alarm pull station 14 and an exterior environment.

A cover 40 of the pull station housing 10 is hingedly attached to the frame 30. A cover sealing ring 43 is configured between the cover 40 and the frame 30 to form an airtight and watertight seal between the cover 40 and the frame 30. The cover 40 may rotate relative to the frame 30 at a hinge 70 (See FIGS. 4 and 5) to shield the alarm pull station 14 or to expose the alarm pull station 14. The cover 40 may be transparent so that the alarm pull station 14 is visible through the cover 40 (See FIG. 3). The cover 40 may be made of glass, plastic, or any other transparent material. A lift tab 47 may extend from the cover 40 and may be grasped when rotating the cover 40 relative to the frame 30.

A magnetic engagement means comprising a cover magnet 42 attached to an inside surface of the cover 40 and a housing magnet 32 attached to the frame 30. Either the cover magnet 42 or the housing magnet 32 made be a metal piece. When a pull force is exerted upon the handle sufficient to overcome the resistance of the magnetic engagement means, the cover is displaced laterally away from the frame in an open position triggering the alarm assembly. Moreover, when the alarm assembly is reset, the magnetic engagement means secures the cover to be in the closed position.

An alarm assembly 50 is configured between the cover 40 and the subplate 60. The alarm assembly 50 houses certain electrical components of the pull station housing 10, including but not limited to a sound emitter 54 and a light source 56. When the cover 40 is opened by rotating the cover 40 away from the frame 30 and thereby breaking the magnetic connection between the cover magnet 42 and the housing magnet 32, the light 56 may flash and the sound emitter 54 may emit a noise to warn that the cover 40 has been opened.

Figure 2:
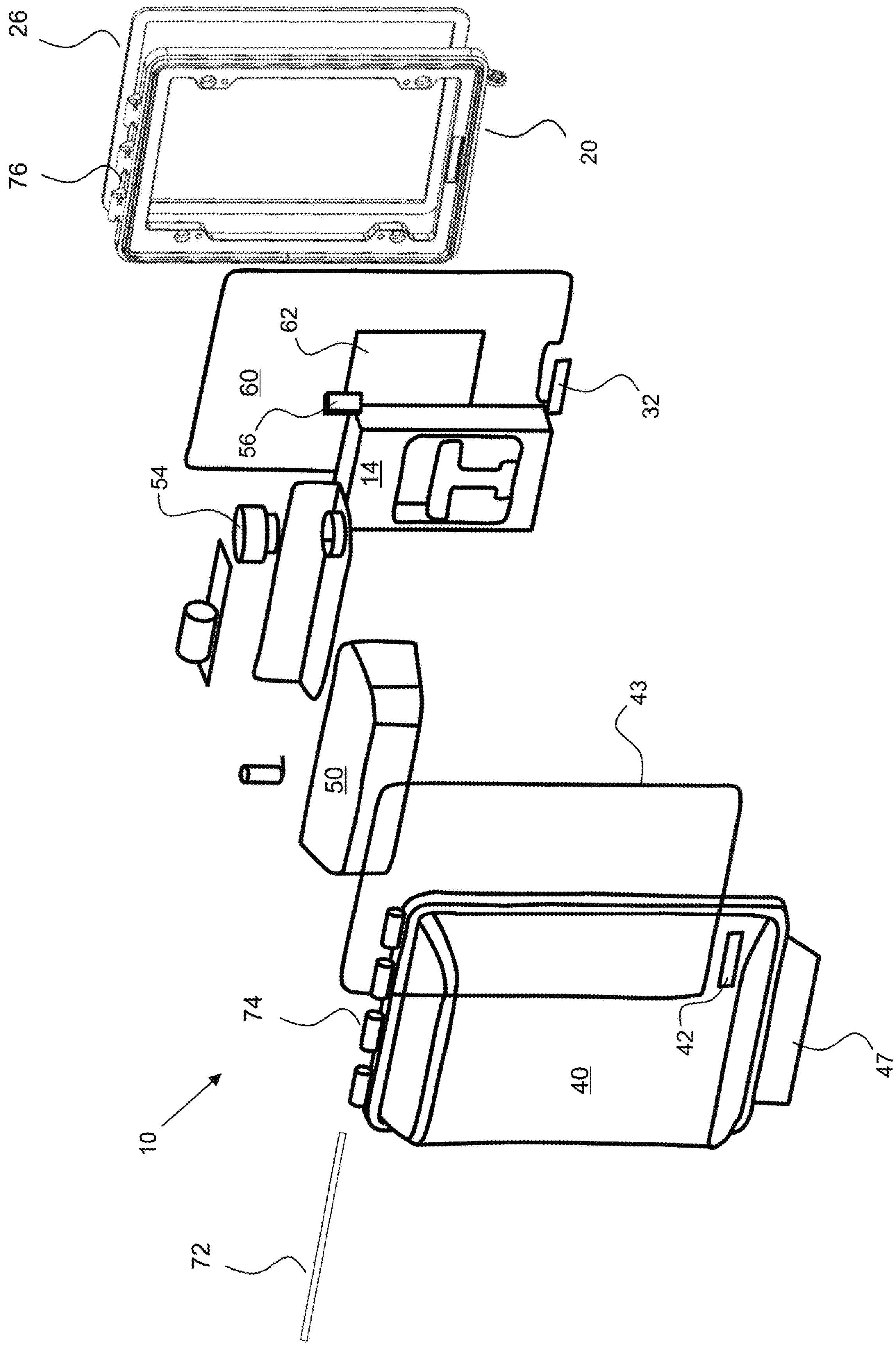
FIG. 2 is a perspective exploded view of a pull station housing in the flush mount configuration according to the present invention.

As shown in FIG. 2, in a flush mount configuration, the cover 40 is hingedly attached to the baseplate 20. The baseplate 20 and base plate seal ring are attached to the wall 16. The housing magnet 32 is attached to the baseplate 20 instead of the frame 20. The cover 40 is opened by rotating the cover 40 away from the baseplate 20. This may still cause the light source 56 of the alarm assembly 50 to flash and the sound emitter 54 of the alarm assembly 50 to emit a noise. The alarm pull station 14 is still contained within the pull station housing 10. As shown, the alarm pull station 14 is still configured between a subplate 60 and the cover 40. The subplate 60 is still shown with a subplate cutout 62 so that electrical wires can be coupled to the alarm pull station 14 through the subplate 60. When the cover 40 is closed, the cover sealing ring 43 may form an airtight and watertight seal between the cover 40 and the baseplate 20.

Figure 3:
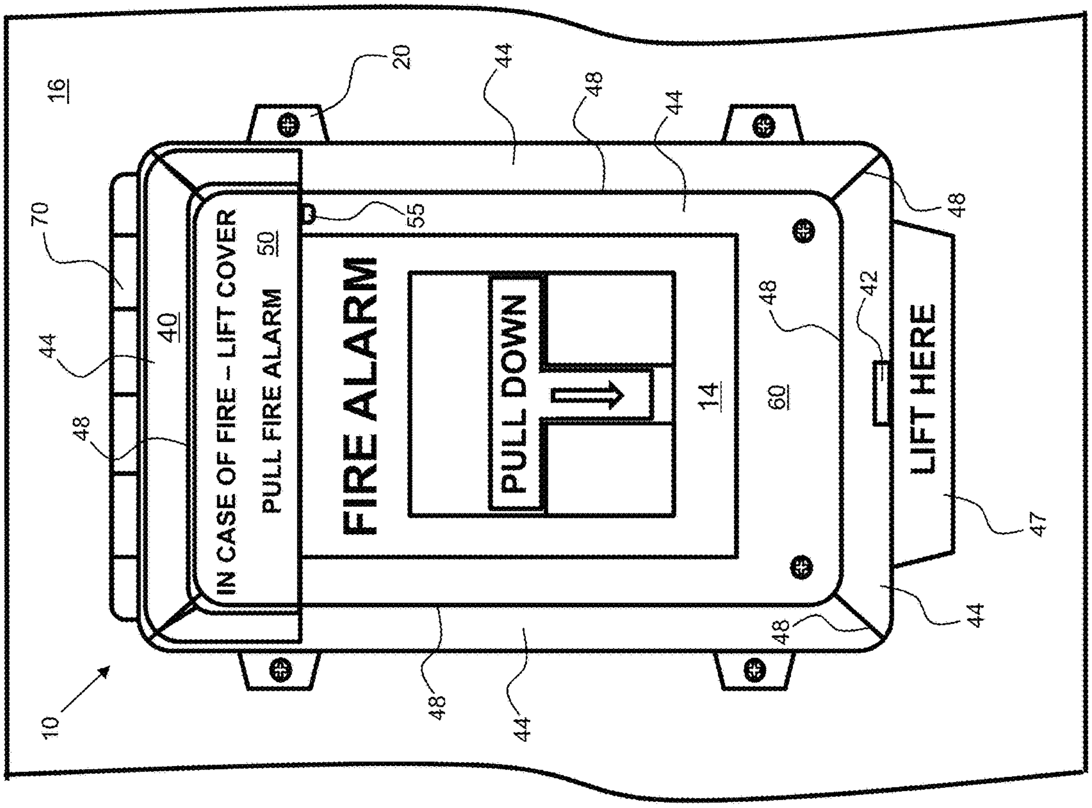
FIG. 3 is a front view of a pull station housing according to the present invention.

As shown in FIG. 3, the baseplate 20 of the pull station housing 10 is attached to a surface 16. The attachment of the baseplate 20 to the surface 16 may be accomplished by nails, threaded fasteners, hook-and-loop fasteners, adhesive, or any other means for attaching a component to a surface. In most embodiments, the surface 16 is a wall, though this is not intended to limit the surface 16 to being a wall in all embodiments. The surface 16 may be a fence, floor, ceiling, door, window, or other feature on which it may be beneficial to install an alarm pull station and corresponding housing. In embodiments wherein the surface 16 is a wall, the surface 16 may be an exterior wall or an interior wall.

The cover 40 has five cover sides 44, each connected to at least one other cover side by a cover edge 48. The cover sides 44 may be flat or may have one or more curvatures. The cover edges 48 are preferably rounded.

The hinge 70 having a hinge pin 72, a cover hinge component 74 and a frame hinge component 76. The hinge 70 is shown that hingedly connects the cover 40 to the baseplate 20 or frame (not visible in FIG. 3) and the cover 40 rotates about the baseplate 20 along the hinge 70.

The alarm pull station 14 and alarm assembly 50 are visible through the cover 40 due to the cover 40 being transparent. Text is provided on the alarm pull station 14 and alarm assembly 50 to aid a user in using the alarm pull station 14 to activate an alarm. Text is also provided on the lift tab 47 to aid a user in lifting the cover 40 to expose the alarm pull station 14.

A delay mechanism 55 is provided on the alarm assembly 50. The delay mechanism 55 protrudes from the alarm assembly 50 so that it may be accessed without opening the alarm assembly 50. When the cover 40 is lifted by rotating the cover 40 away from the baseplate 20 or frame, the alarm assembly 50 emits light and/or noise to alert a user that the cover 40 has been opened. This is beneficial if the alarm pull station 14 is being used to activate an alarm, or if the cover 40 has been lifted unintentionally. However, if maintenance is being performed on the alarm pull station 14, then it would not be beneficial for light and/or noise to be emitted from the alarm assembly 50. Therefore, the delay mechanism 55 may be engaged to deactivate the electrical components within the alarm assembly that emit light and/or noise. When maintenance is performed on the alarm pull station 14, the cover 40 may be lifted to expose the alarm pull station 14 and the delay mechanism 55 may be engaged to cease the light and/or noise being emitted from the alarm assembly 50 due to the cover 40 being in the open position.

Figure 4:
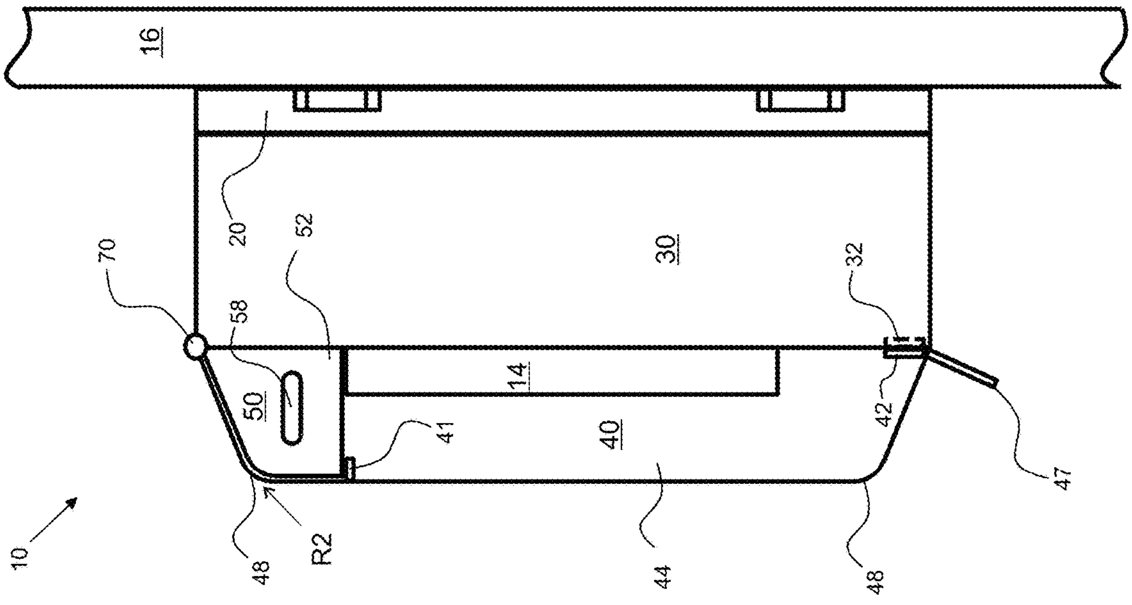
FIG. 4 is a right side view of a pull station housing in a closed position according to the present invention.
Figure 6:
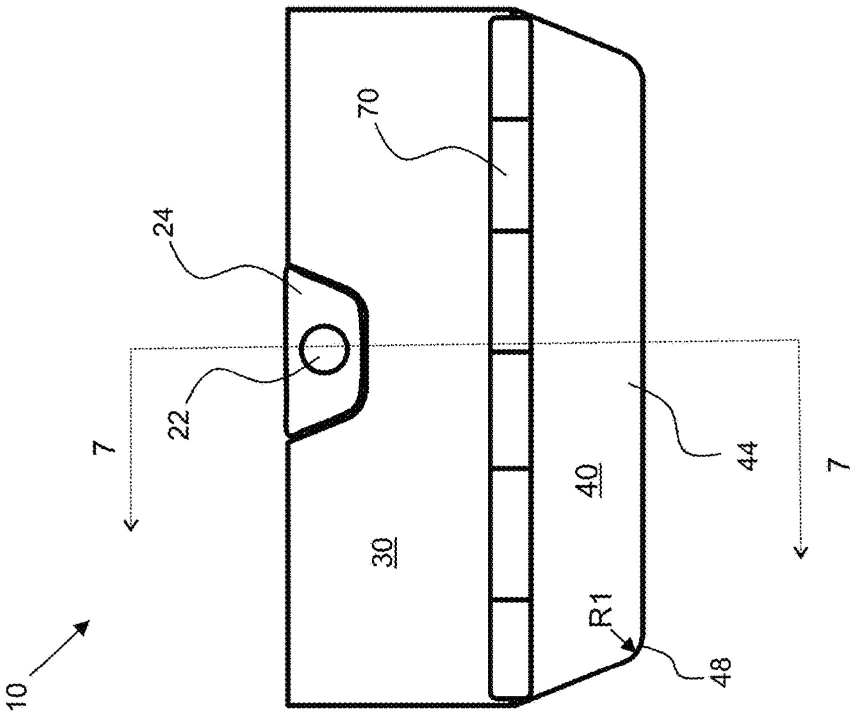
FIG. 6 is a top view of a pull station housing according to the present invention.

As shown in FIGS. 4 and 6, the cover having sides 44 and side edges 48. The edges 48 having a lateral radius of curvature R1 (See FIG. 6) and a vertical radius of curvature R2 (See FIG. 4). R1 may be from 0.500 to 1.000 inches, preferably about 0.875, most preferably 0.875 inches. R2 may be from 0.15 to 0.50 inches, preferably about 0.25 inches, and most preferably 0.25 inches.

Figure 5:
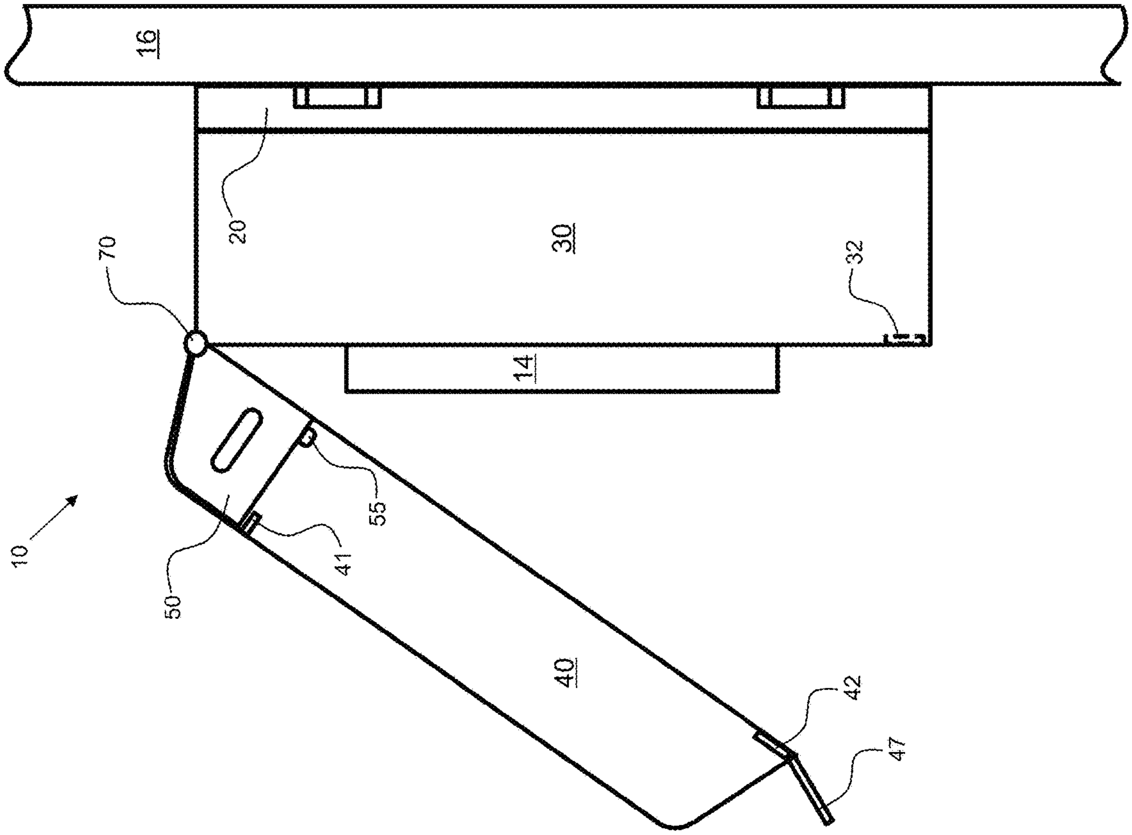
FIG. 5 is a right side view of a pull station housing with a cover configured in an open position according to the present invention.

As shown in FIGS. 4 and 5, the alarm pull station 14 may extend from the frame 30 so that it is at least partially visible from a side view of the cover 40. The alarm assembly 50 having sides 52 is visible from a side view of the cover 40. In FIG. 4, the cover 40 is shown as closed (i.e. in a closed position). The cover magnet 42 and housing magnet 32 are contacting each other to keep the cover 40 in the closed position. In FIG. 5, the cover 40 is shown as opened (i.e. in an open position). The cover magnet 42 and housing magnet 32 are not contacting. The cover 40 is "lifted" such that it rotates about the hinge 70 away from the frame 30 and away from the baseplate 20. In an open position, the alarm pull station 14 is accessible for use or for maintenance.

The alarm assembly 50 having side openings 58 are configured in the alarm assembly right side and left side. When the cover 40 is opened and light is emitted from the alarm assembly 50, light from the alarm assembly 50 is visible from a side view.

As shown in FIG. 6, the conduit opening 22 is configured through a conduit insert 24. The conduit insert is configured in an opening within the frame 30, but may also be configured between the frame 30 and the baseplate (not shown in FIG. 6). The conduit insert 24 may be made of foam when the pull station housing 10 is attached to an interior surface of a structure. The conduit insert 24 may be made of plastic when the pull station housing 10 is attached to an exterior surface of a structure. The plastic material of the conduit insert 24 may provide a better barrier against debris, extreme temperatures, and water that may affect the functionality of the alarm pull station. The foam material of the conduit insert 24 may expand within its respective opening in the frame or between the frame or baseplate and therefore may form a better seal than the plastic material of the conduit insert. In some embodiments, the conduit insert may be made of both foam and plastic and may be used when the pull station housing 10 is attached to an interior surface or an exterior surface.

Figure 7:
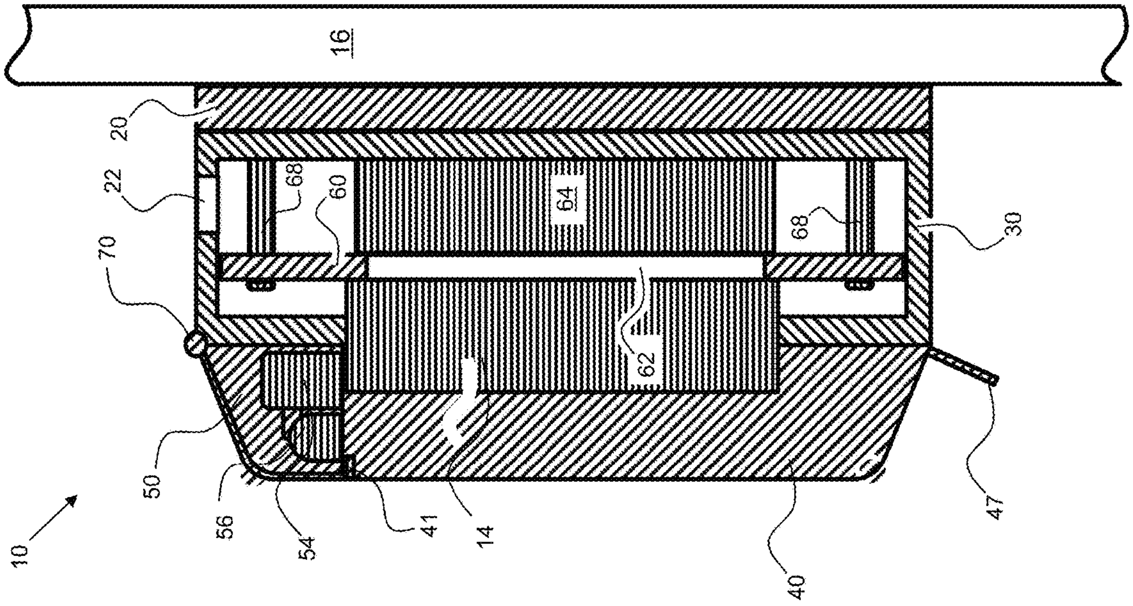
FIG. 7 is a right side cross-section view of a pull station housing along lines 7-7 of FIG. 6, according to the present invention.

As shown in FIG. 7, the sound emitter 54 and the light 56 are housed within the alarm assembly 50. The subplate 60 is connected to a rear face of the frame 30 and is separated from said rear face by the subplate offsetters 68. The temperature component 64 is configured between the subplate 60 and the baseplate 20. The alarm pull station 14 and temperature component 64 are exposed to one another via the subplate cutout 62. The conduit opening 22 is configured in the frame 30 and allows a conduit to be inserted into the frame 30.

Figure 8:
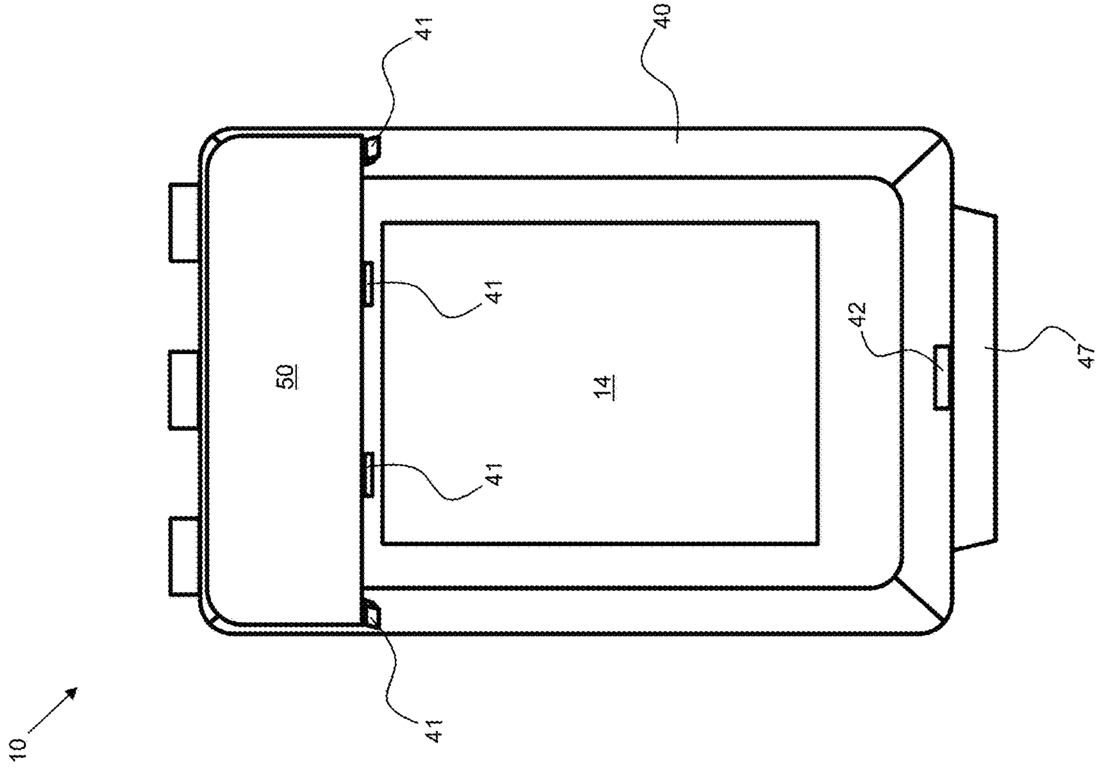
FIG. 8 is a rear view of a pull station housing according to the present invention.

As shown in FIG. 8, cover nubs 41 are configured on the interior of the cover 40. The cover nubs 41 are configured in a pattern about the cover 40 to form a space into which the alarm assembly 50 is placed. The alarm assembly 50 may be held against the cover 40 by an interference fit with the cover nubs 41. This allows the alarm assembly 50 to be tightly held to the cover 40 without the need of a screw which compromises the airtight seal from moisture or debris. The movement of the alarm assembly 50 away from the frame 30 or baseplate 20 along the hinge 70 when the cover 40 is opened may trigger the light of the alarm assembly to emit light and/or the sound emitter of the alarm assembly 50 to emit noise. The nubs 41 are configured in such a way to provide enough space for the alarm pull station 14 to be covered by the cover 40 along with the alarm assembly 50. The nubs 41 are configured in such a way as to not interfere with the placement of the alarm pull station 14 or to interfere with a user accessing the alarm pull station 14.

Figure 10:
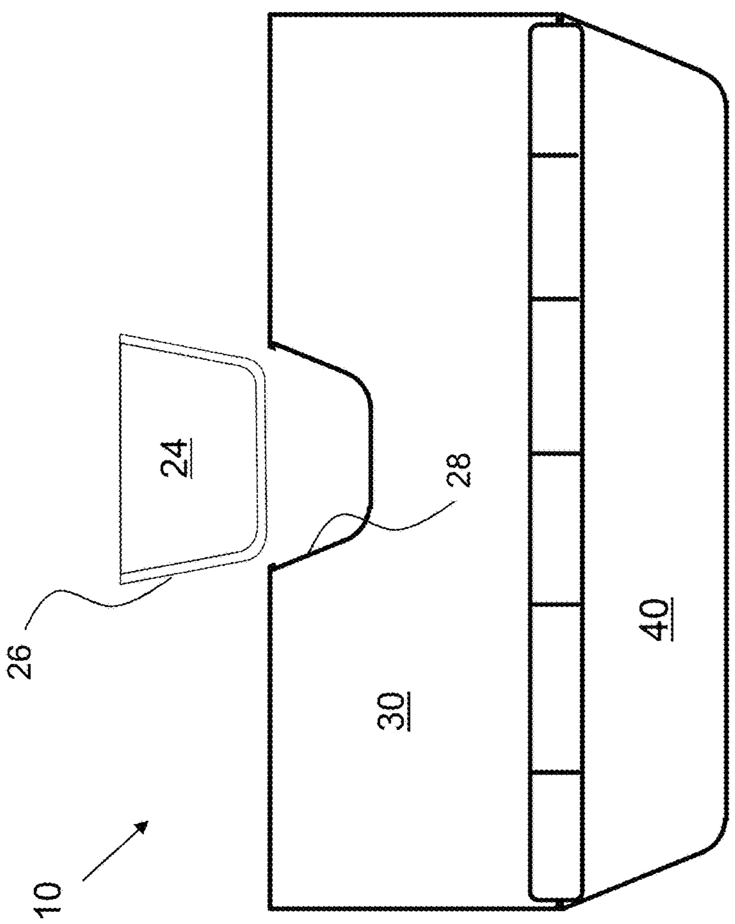
FIG. 10 is a top view of the pull cover sliding into the groove of the frame according to the present invention.
Figure 9A:
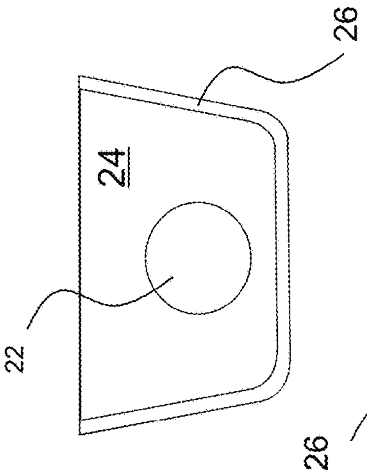
FIG. 9A is a top view of a conduit insert according to the present invention.
Figure 9B:
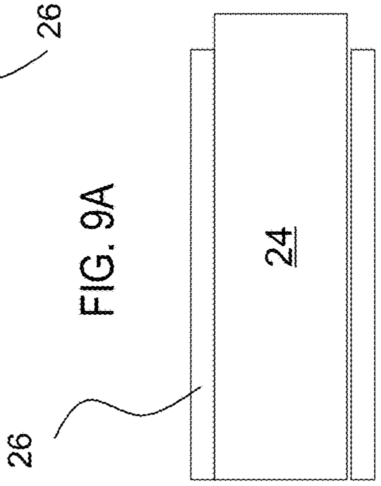
FIG. 9B is a side view of the conduit insert according to the present invention.
Figure 9C:
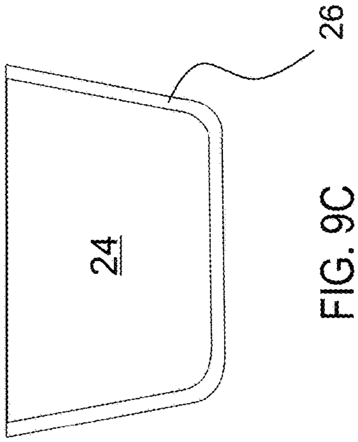
FIG. 9C is a top view of a solid conduit insert according to the present invention.

FIG. 9A is a top view of the foam conduit insert 24 with a conduit opening 22 and a conduit flange 26 configured to fit tightly within the conduit groove 28 (See FIG. 10); and FIG. 9C is a top view of a solid foam conduit insert 24. As shown in FIG. 10, the foam conduit insert 24 engages the frame 30, wherein the conduit insert flange 26 engages the conduit groove 28 such that it creates an airtight seal of the pull cover 10 when it is attached to a wall or a surface 16.

Figure 12:
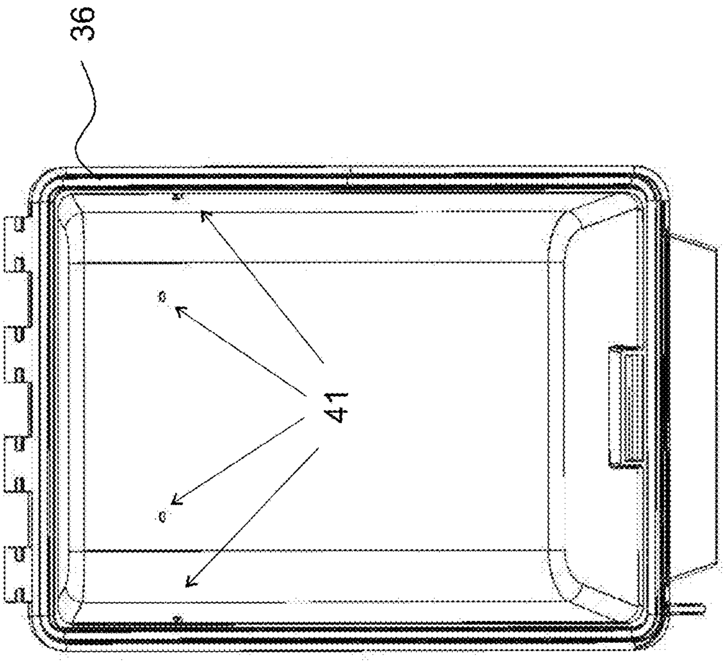
FIG. 12 is a rear view of the cover according to the present invention.
Figure 11:
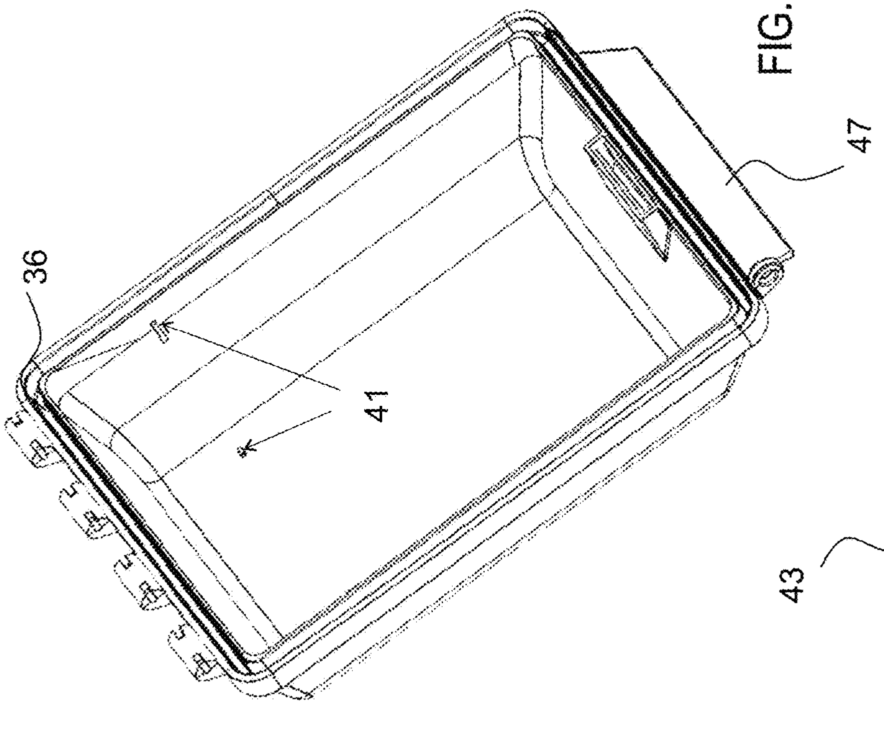
FIG. 11 is a perspective view of the back of the cover according to the present invention.

FIGS. 11 and 12 show the rear view of the cover 40 having a groove 36, nubs 41, and handle 47.

Figure 13:
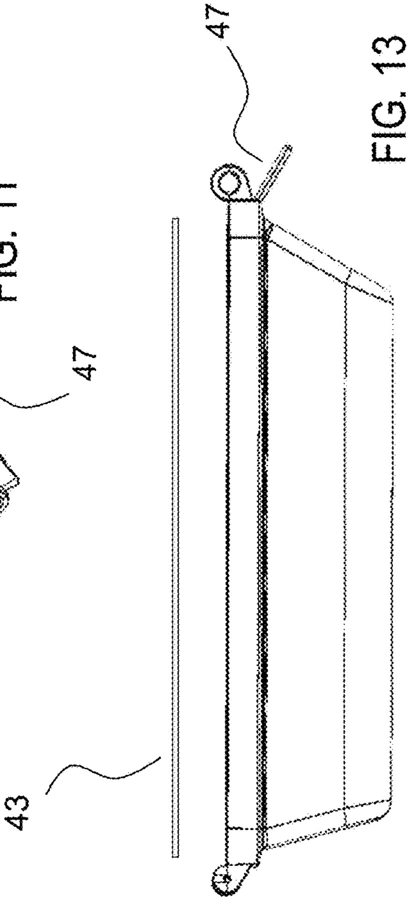
FIG. 13 is a horizontal exploded view of the cover and the cover sealing ring according to the present invention.

FIG. 13 is an exploded view of the cover 40 and the seal ring 43, wherein the seal ring 43 tightly engages the groove 36 by an interference fit.

Figure 15:
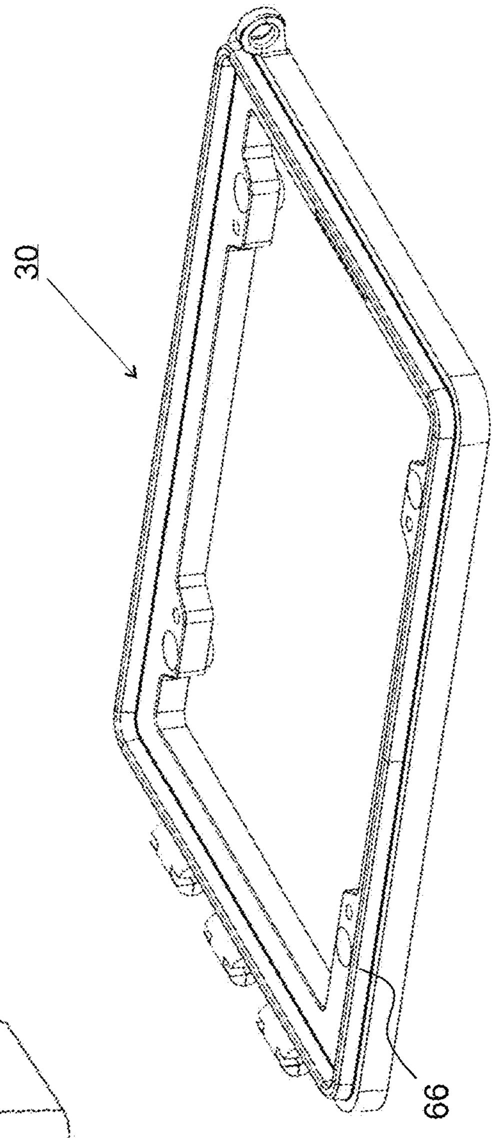
FIG. 15 is a perspective view of the flush mount frame according to the present invention.
Figure 14:
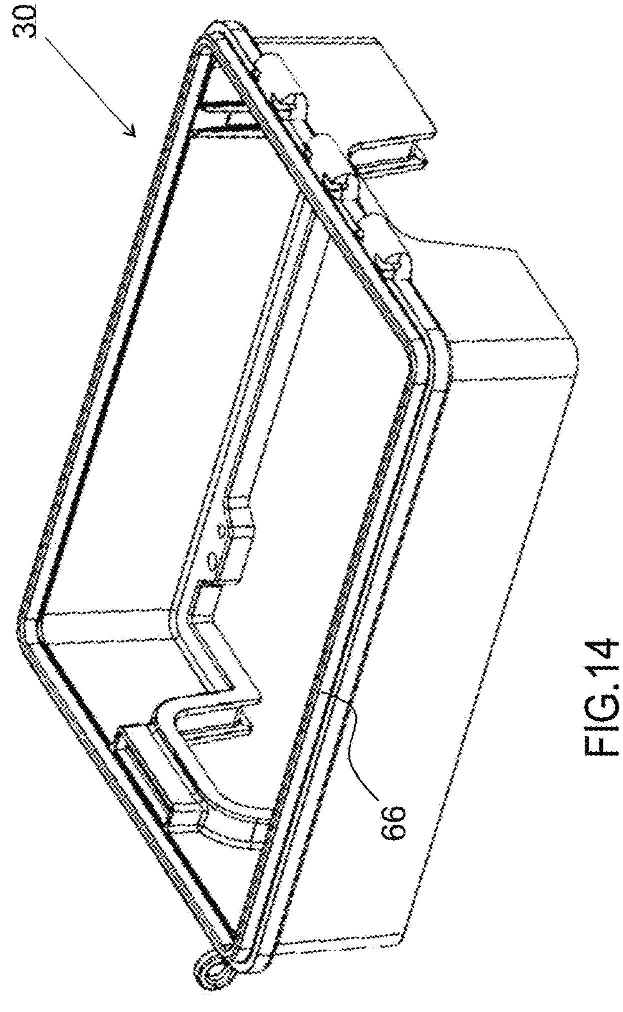
FIG. 14 is a perspective view of the surface mount frame according to the present invention.

FIG. 14 is a perspective view of the surface mount frame 30 having tongue 66 and FIG. 15 is a perspective view of the flush mount frame 30 having tongue 66. When the pull station housing 10 is in the closed position (See FIG. 4), the tongue 66 engages the groove 36, wherein the tongue 66 compresses the seal ring 43 within the grove 36 by the magnetic engagement means.

While the invention herein disclosed has been described by means of specific embodiments and applications thereof, numerous modifications and variations could be made thereto by those skilled in the art without departing from the scope of the invention set forth in the claims.

The invention claimed is:

1. A fire alarm pull station housing comprising:
- a baseplate removably attached to a surface;
- a frame removably attachable to the baseplate and forming a perimeter around an alarm pull station;
- a cover hingedly attached to the frame;
- a handle secured to the cover;
- a magnetic engagement means;
- an alarm assembly, wherein when a pull force is exerted upon the handle sufficient to overcome the resistance of the magnetic engagement means, the cover is displaced laterally away from the frame in an open position triggering the alarm assembly; and
- the magnetic engagement means securing the cover to the frame when no pull force is exerted.

2. The pull station housing of claim 1, wherein a sealing member is interposed between the cover and the frame, and wherein the magnetic engagement means urges the cover toward the frame, compressing the sealing member, thereby forming a substantially airtight and dust-resistant seal.

3. The pull station housing of claim 1, wherein the cover further having:
- a cover front and a cover rear;
- the cover rear having a groove along the perimeter to receive the frame; and
- a plurality of curved edges.

4. The pull station housing of claim 1, wherein the alarm assembly further having:
- a front, a back, a top, a bottom, a left side, and a right side, wherein the right side and the left side have openings to emit light from an interior light source.

5. The pull station housing of claim 1, wherein the cover having an exterior surface and an interior surface, wherein the alarm assembly is secured to the interior surface of the cover by a plurality of nubs to securely hold the alarm assembly by an interference fit.

6. The pull station housing of claim 1, wherein the frame having:
- a front side and a back side;
- a groove along the perimeter of the back side of the frame to receive a sealing member to form a seal between the frame and the baseplate; and
- a tongue along the perimeter of the front side of the frame to engage the cover groove.

7. The pull station housing of claim 1, wherein the cover further having:
- a front side and a back side;
- a groove along the perimeter of the back side of the cover to receive a cover sealing ring to form a seal between the cover and the frame.

8. The pull station housing of claim 1, wherein the frame further having:
- a top curved cut-out;
- a bottom curved cut-out;
- the top and bottom curved cut-outs having a predetermined radius and grooves.

9. The pull station housing of claim 8, further having:
- a conduit insert sized and shaped to engage the top and bottom curved cut-outs, wherein the conduit insert conforms to the shape of the curved cut-outs for a conformal fit.

10. The pull station housing of claim 9, wherein the conduit insert is made of foam like material.

11. The pull station housing of claim 1, further having:
- a subplate configured within the frame and separating the alarm pull station from the baseplate, the subplate comprising a subplate cutout revealing at least a portion of the alarm pull station to the baseplate.

12. The pull station housing of claim 11, further having a plurality of subplate offsetters separating the subplate and the baseplate.

13. The pull station of claim 1, wherein the alarm assembly further having a delay mechanism that, when activated, causes the alarm assembly to cease emitting noise for a pre-programed duration.

14. A fire alarm pull station housing comprising:
- a baseplate frame removably attached to a surface forming a perimeter around an alarm pull station;
- a cover hingedly attached to the baseplate frame;
- a handle secured to the cover;
- a magnet engagement means;
- an alarm assembly, wherein when a pull force is exerted upon the handle sufficient to overcome the resistance of the magnetic engagement means, the cover is displaced laterally away from the frame in an open position triggering the alarm assembly; and
- the magnetic engagement means securing the cover to the frame when no pull force is exerted.

15. The pull station housing of claim 14, wherein a sealing member is interposed between the cover and the baseplate frame, and wherein the magnetic engagement means urges the cover toward the frame, compressing the sealing member, thereby forming a substantially airtight and dust-resistant seal.

16. The pull station housing of claim 14, wherein the cover having:
- a plurality of curved edges; and
- an exterior surface and an interior surface, wherein the alarm assembly is secured to the interior surface of the cover by a plurality of nubs to securely hold the alarm assembly by an interference fit.

17. The pull station house of claim 14, wherein the alarm assembly further having:

a front, a back, a top, a bottom, a left side, and a right side, wherein the right side and the left side have openings to emit light from an interior light source.

18. A fire alarm pull station housing comprising:

a baseplate frame removably attached to a wall forming a perimeter around an alarm pull station;

a cover hingedly attached to the baseplate frame, wherein the cover has an exterior surface and an interior surface;

a handle secured to the cover;

a magnetic engagement means; an alarm assembly, wherein when a pull force is exerted upon the handle sufficient to overcome the resistance of the magnetic engagement means, the cover is displaced laterally away from the subplate frame in an open position triggering the alarm assembly;

the magnetic engagement means securing the cover to the frame when no pull force is exerted;

and the alarm assembly is secured to the interior surface of the cover by a plurality of nubs by an interference fit.

19. The pull station housing of claim 18, wherein the alarm assembly further having:

a front, a back, a top, a bottom, a left side, and a right side, wherein the right side and the left side have openings to emit light from an interior light source.

20. The pull station of claim 18, wherein the alarm assembly further having a delay mechanism that, when activated, causes the alarm assembly to cease emitting the noise for a pre-programed duration.

* * * * *